United States Patent [19]

Stenerhag et al.

[11] Patent Number: 4,464,700
[45] Date of Patent: Aug. 7, 1984

[54] POWER CAPACITOR

[75] Inventors: Bo Stenerhag, Upsala; Lars E. Wirsen, Saltsjö-Duvnäs, both of Sweden

[73] Assignee: ASEA Aktiebolag, Västerås, Sweden

[21] Appl. No.: 449,877

[22] Filed: Dec. 15, 1982

[30] Foreign Application Priority Data

Dec. 17, 1981 [SE] Sweden .............................. 8107577
Feb. 19, 1982 [SE] Sweden .............................. 8201030

[51] Int. Cl.³ .......................... H01G 1/14; H01G 4/06
[52] U.S. Cl. ...................................... 361/307; 361/313
[58] Field of Search ..................... 361/273, 303–315, 361/323, 324

[56] References Cited

U.S. PATENT DOCUMENTS

| | | | |
|---|---|---|---|
| 2,638,494 | 5/1953 | Liechti | 361/314 X |
| 3,090,895 | 5/1963 | Hall | 361/303 |
| 3,398,339 | 8/1968 | Pierpont et al. | 361/307 |
| 3,714,528 | 1/1973 | Vail | 361/303 |
| 3,917,986 | 11/1975 | Rice et al. | 361/304 |
| 4,054,937 | 10/1977 | Mandelcorn et al. | 361/319 |
| 4,320,437 | 3/1982 | Shaw et al. | 361/303 |

FOREIGN PATENT DOCUMENTS 43638 1/1982 European Pat. Off.
1019190 1/1953 France.
1146111 3/1969 United Kingdom.

Primary Examiner—Donald A. Griffin
Attorney, Agent, or Firm—Watson Cole Grindle & Watson

[57] ABSTRACT

A wound capacitor element for a power capacitor is built up of electrodes of metal foils and a solid dielectric comprising polymer films. Adjacent each end surface of the capacitor element, (a) one of the metal foils is arranged with its longitudinal edge inside the longitudinal edges of the polymer films and there exposed to the end surface between adjacent polymer films and with its longitudinal edge folded along a line extending at least substantially in the longitudinal direction of the metal foil, and (b) one of the metal foils is arranged with its longitudinal edge unfolded at least along the main portion of its length. Each of the metal foils is arranged in contact with separate current tap strips which, from the interior of the capacitor element, protrude outside one end surface of the capacitor element. Where such a current tap strip protrudes from one of the metal foils, the other metal foil, at least in those portions which form the layers located nearest to said current tap strips in the capacitor element, is folded along a line extending at least essentially in the direction of the metal foil.

16 Claims, 6 Drawing Figures

POWER CAPACITOR

BACKGROUND OF THE INVENTION

1. Field of the Invention

This invention relates to a capacitor element and to a power capacitor built up of at least one such capacitor element. Usually a power capacitor comprises a plurality of capacitor elements which are connected in series and/or parallel so as to obtain the desired capacitor data.

2. Description of the Prior Art

A known capacitor element is often of the wound type, i.e. it is built up of several wound turns of metal foils, serving as electrodes, and a solid dielectric, usually in the form of polymer films and paper, arranged therebetween. After drying, the capacitor is impregnated with a suitable dielectric fluid in order to fill up all existing voids in the capacitor units with fluid and to suppress partial discharges. In this connection, the paper layers act as wicks for sucking the dielectric fluid into the inner portions of the capacitor elements. Capacitors with a solid dielectric of only polymer film are also known.

In the power capacitors which occur most frequently on the market, in the or each capacitor element, the polymer films have greater width than the metal foils. Films and foils are thereby arranged so that longitudinal edges of the metal foils are located inside longitudinal edges of the polymer films and are exposed to the end surfaces of the capacitor element between adjacently located polymer films. In such capacitor elements, the foils are arranged in electrical contact with separate current tap strips, which from the interior of the capacitor element protrude outside one or both end surfaces of the capacitor element, i.e. outside one or both longitudinal edges of the polymer films. The purpose of the current tap strip is to connect the metal foils to external connection conductors. Each metal foil electrode in the element is thereby provided with such a number of current tap strips as is required for supply and discharge of electric current of the intended magnitude to and from the capacitor units. Often the number of current tap strips is small and the current tap strips arranged at great mutual distances, so that they only cover a few percent, or less, of the length of each metal foil.

According to a known, similarly commercial modification of the capacitor described above, a capacitor element is provided in which there are first and second metal foils, the first metal foil being provided with both its longitudinal edges folded inwardly (i.e. at the two end surfaces of the capacitor element) and the second metal foil having unfolded longitudinal edges. Also the edges at the beginning and end of the wound metal foils may be transversely folded in, i.e. folded across the longitudinal direction of the foils. The folding results in improved partial discharge properties, which is due to a folded edge becoming relatively even and rounded and without sharp points and irregularities, which may occur on an edge which is cut in the usual way.

The present invention seeks to provide a capacitor element or capacitor elements which when incorporated in a capacitor markedly improves the partial discharge properties of the capacitor, the or each capacitor element comprising wound metal foils separated by solid dielectric material comprising polymer films and, at each end surface of the capacitor element, one of the metal foils being arranged with a folded edge inside the edge of the polymer films, and one of the metal foils being arranged with an unfolded edge. Current tap strips are also arranged to protrude outside one or both end surfaces of the capacitor element. The improvement of the partial discharge properties can be achieved with retained, or with only a negligible increase of the thickness of the capacitor. To the same extent as the partial discharge properties of the capacitor are improved, the performance and reliability of operation of the capacitor are improved since these properties are dependent on the partial discharge properties.

SUMMARY OF THE INVENTION

According to one aspect of the present invention there is provided a capacitor element for a power capacitor comprising first and second metal foils wound together, solid dielectric material comprising polymer films separating the wound first and second metal foils from each other, there being, adjacent each end of the capacitor element, one longitudinal metal foil edge which is unfolded at least along a major part of its length and one longitudinal metal foil edge which is folded at least substantially longitudinally throughout its length, is arranged inside the longitudinal edges of the polymer films and is exposed to the respective ends of the capacitor elements, at least one current tap strip in contact with the first metal foil and at least one further current tap strip in contact with the second metal foil, the said current tap strips constituting separate elements and protruding endwise from the capacitor element, each tap strip, adjacent the end of the capacitor element from which it protrudes, being positioned between folded edge portions of adjacent wound layers of the metal foil which the tap strip does not contact, said folded edge portions being folded substantially in the longitudinal direction of the metal foil in question. Thus at least one current tap strip for each of the metal foils is surrounded, at least at the end surface of the capacitor element from which it protrudes, by at least adjacent layers of the other metal foil which have a folded longitudinal edge.

A possible explanation of the improvement of the properties of a capacitor, discovered by the present invention, may be the following. The regions around that where current tap strips protrude from metal foils in known capacitors may be weak spots from the point of view of partial discharge, and these weak spots, despite the small part of the length of the foils covered thereby, may be determining for the partial discharge properties for the whole capacitor element. According to this theory, such weak spots would be eliminated according to the invention by providing each metal foil with current tap strips which, at the place where the current tap strip protrudes from the capacitor element, are surrounded by layers of the second metal foil with folded edges.

Suitably the first metal foil is arranged in contact with at least one current tap strip which protrudes outside one end surface of the capacitor element. At or adjacent this one end surface the first metal foil is provided with a folded longitudinal edge and the second metal foil is arranged with its edge unfolded along at least the main portion of its length but folded along a line, extending at least essentially in the longitudinal direction of the second metal foil, along portions of its length which in the capacitor element form layers located nearest a current tap strip for the first metal foil. Since the folding of the otherwise unfolded edge is only performed in the region around said current tap strip and these current tap strips, as mentioned previously, are arranged with large mutual distances therebetween, the limited folding only involves a negligible increase in the thickness of the capacitor element, which is important. The total length of folded portions preferably constitute at most 15% of the length of the otherwise unfolded metal foil.

Alternatively the improvement of the performance of the capacitor element is achieved by arranging the first metal foil with a folded edge adjacent one end surface of the capacitor element and with an unfolded edge adjacent the other end surface of the capacitor element, by arranging the second metal foil with an unfolded edge adjacent the said first-mentioned one end surface of the capacitor element and with a folded edge adjacent the said other end surface of the capacitor element, and by arranging each metal foil in contact with current tap strips which, from the interior of the capacitor element, protrude outside the end surfaces of the capacitor element at an unfolded edge of the metal foil. In addition, each of the metal foils may be arranged with its longitudinal edge outside the longitudinal edges of the polymer films at the end surface of the capacitor element where current tap strips for the metal foil protrude.

A folding of the end edges at the beginning and end of each metal foil, i.e. of the first and the last wound portion, respectively, of each foil, transversely of the longitudinal direction of the foil or at another angle with the longitudinal direction of the foil, may result in a further improvement of the partial discharge properties of the capacitor.

The invention is suitable for use in capacitors with polymer film and paper (e.g. cellulose) as solid dielectric, as well as in capacitors with only polymer film as solid dielectric. The improvement of the partial discharge properties obtained according to the invention permits, with maintained performance of a capacitor, the use of thicker polymer films than that would otherwise be possible and permits, with maintained thickness of the polymer film, the use of a capacitor at a higher stress than what would otherwise be possible. This is of great economic importance. This is particularly true of capacitors with only polymer film as solid dielectric, because the freedom to choose the thickness of the polymer film to attain optimum properties of the capacitor is of greater importance for such capacitors than for capacitors in which paper is included in the dielectric.

The metal foils preferably consist of aluminium foils but also foils of other metals, e.g. copper, can be used. Metal foils which in their entire length have folded longitudinal edges are preferably arranged, in the capacitor element, with their edges inside edges of metal foils which in their entire length or with the main portion of their length are arranged with unfolded longitudinal edges. The current tap strips may advantageously be of the same material as the metal foils. Metal foils and current tap strips of conventional thicknesses can be used.

The polymer film preferably consists of polypropylene. Other polymers that can be used in the film are other polyolefines such as polyethylene, copolymerisates of ethylene and propene and polymethyl pentene, further polycarbonate, polyethyleneglycol terephthalate and polyimide. Also the polymer film may be of a conventional thickness.

According to another aspect of the present invention there is provided a power capacitor comprising at least one capacitor element according to said one aspect of the present invention.

According to a further aspect of the present invention a power capacitor comprising at least one wound capacitor element, which is built up of first and second metal foils and a solid dielectric comprising polymer films, and in which at each end surface of the capacitor element (a) one of the metal foils is arranged with its edge inside the edges of the polymer films and there exposed to the capacitor element end surface between the polymer films and with its edge folded along a line extending at least essentially in the longitudinal direction of the metal foil, and (b) one of the metal foils is arranged with its edge unfolded at least along the main part of its length and in which each metal foil is arranged in contact with separate current tap strips, which from the interior of the capacitor element protrude outside one end surface of the capacitor element, is characterised in that each metal foil is arranged in contact with a current tap strip which, at the end surface of the capacitor element where this current tap strip protrudes, is surrounded, at least nearest the current tap strip, by layers of the other metal foil, in which the other metal foil is arranged with its edge folded along a line extending at least essentially in the longitudinal direction of the metal foil.

BRIEF DESCRIPTION OF THE DRAWINGS

The invention will now be described in greater detail and by way of example with reference to the accompanying drawings, in which.

DESCRIPTION OF THE PREFERRED EMBODIMENTS

Figure 1:
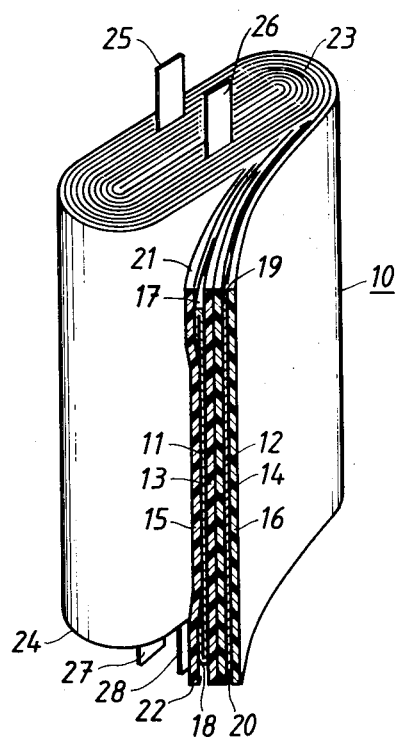
FIG. 1 is a perspective view of one embodiment of a capacitor element according to the invention.

In FIG. 1 there is shown a capacitor element 10 according to the invention which is built up of two aluminium foils 11 and 12 and of four polypropylene films 13, 14, 15 and 16 wound together in several turns around a symmetry axis to form a cylindrical body which has subsequently been flattened. In the capacitor element 10 shown, each aluminium foil 11, 12 has a thickness of from 5–10 $\mu$m and a width in its unfolded state of 305 mm, and each polypropylene film has a thickness of from 10–20 $\mu$m and a width of 322 mm. The polypropylene films are positioned so that their longitudinal edges 21 and 22 occupy common planes at each end of the capacitor element 10 which are perpendicular to the winding axis in FIG. 1. The two longitudinal edges of the aluminium foil 11 are designated 17 and 18, respectively, and the two longitudinal edges of the aluminium foil 12 are designated 19 and 20, respectively. The end surfaces of the capacitor element are designated 23 and 24, respectively.

The aluminium foil 11 is arranged with its edges 17 and 18, which are folded in the entire length of the foil, inside the edges 21 and 22, respectively, of the polymer films 13–16 at the two end surfaces 23 and 24 of the capacitor element. The longitudinal edge 19 of the aluminium foil 12 is unfolded along the main portion of its length and the unfolded portions of the edge 19 are arranged outside the longitudinal edge 17 of the metal foil 11 but inside the longitudinal edge 21 of the polymer films at the end surface 23 of the capacitor element. The longitudinal edge 20 of the aluminium foil 12 is unfolded along the entire length of the foil and is located outside the longitudinal edge 18 of the metal foil 11 but inside the longitudinal edge 22 of the polymer film at the end surface 24 of the capacitor element. The aluminium foil 11 is arranged in contact with two current tap strips 25 and 26 of aluminium which protrude outside the end surface 23 of the capacitor element. The aluminium foil 12 is arranged in contact with two current tap strips 27 and 28 of aluminium which protrude outside the end surface 24 of the capacitor element. Also the latter strips 27 and 28 could with advantage be arranged at the end surface 23. The current tap strips are arranged at a large mutual distance in the longitudinal direction of the aluminium foil.

Figure 2:
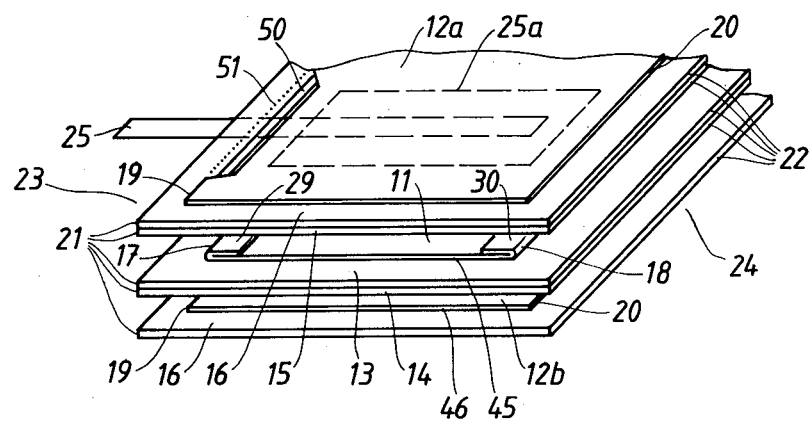
FIG. 2 is a schematic view, on an enlarged scale, of a straightened-out part of the capacitor element shown in FIG. 1 in the region of a current tap strip.

The portions of the capacitor element 10 which are located nearest the current tap strip 25 are shown in FIG. 2 on an enlarged scale in a straightened-out condition and with the foils displaced from the films for the sake of clarity only. The folded border at the edge 17 of the metal foil 11 is designated 29 and the folded border at the edge 18 is designated 30. The folding is performed along a line in the longitudinal direction of the foil 11 and throughout the entire length of the foil. Each border at the edges 17 and 18 may have a width of, for example, 3 mm. The distance between an edge 21 (22) on a polymer film and a folded edge 17 (18) on the metal foil 11 is, in the exemplified case, from 11–12 mm, and the distance between an edge 21 (22) on a polymer film and the edge 19 (20) at an unfolded portion of the metal foil is from 8–9 mm. The tap strips 24–28 are, as shown for the strip 25, suitably fixed, for example, pointwise by pressing or welding at a foil piece 25a of aluminium (in analogous manner for the other strips 26, 27 and 28) to provide a larger contact surface with the respective foil. Each current tap strip may, for example, have a width of 13 mm and a thickness of 100 μm. Each foil piece 25a may have the same thickness as the foils 11 and 12, possibly they may be thicker. The current tap strips with the associated foil pieces are arranged in the capacitor element during the winding thereof by being inserted loosely between the foils and films in question. Thus, for example, the tap strips 25 with the foil piece 25a is arranged between the foil 11 and the film 15. The tap strip 26 is arranged in a corresponding way whereas the tap strips 27 and 28 are arranged between the foil 12 and the film 14.

In accordance with the present invention, the metal foil 12 is arranged with a folded edge 50 in those portions of the length of the foil which are located in the layers 12a and 12b of the metal foil 12 located on either side of the current tap strip 25. Only the folded edge in the layer 12a of the foil 12 is visible in FIG. 2. Instead of arranging two separate, folded portions of the foil 12, as in the case shown in FIG. 2, it is suitable to arrange only one coherent folded region with greater length than in a turn of the foil 12, so that folded portions of this foil are arranged on both sides of the current tap strip 25. In the exemplified case the total length of all portions with folded edges 50 consitutes 10% of the entire length of the metal foil 12. The dotted line 51 indicates where the position of the longitudinal edge 50 of the foil 12 would have been if the edge 50 had not been folded. The width of the folded border is suitably 3 mm.

The edges at the beginning and end of each metal foil may also be folded. If in FIG. 2 the edge 45 on the foil 11 or the edge 46 on the foil 12 constitute the first or last portion of the respective wound-on foil, it would be folded transversely, i.e. along a line which is perpendicular to or which makes an angle with the longitudinal direction of the foil. If said line is perpendicular to the longitudinal direction, a folded border is obtained corresponding to the folded borders 29 and 30 but extending perpendicular to said borders.

Figure 3:
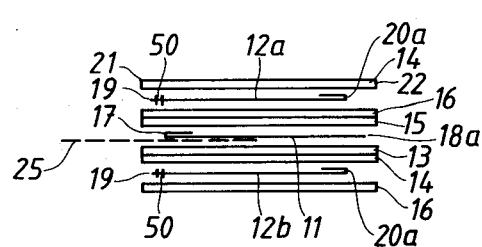
FIGS. 3 to 5 are schematic views of alternative embodiments of a capacitor element according to the invention.

FIG. 3 shows schematically a different embodiment of part of a capacitor element according to the present invention. According to this embodiment, the metal foil 11 has a folded edge 17, along its entire length, at the end surface 23 of the element but an unfolded edge 18a at the end surface 24 of the element. As in the case shown in FIG. 2, the metal foil 12 is arranged, at its edge 19, with a folded portion or portions only in the regions around the current tap strips 25 and 26, whereas the rest of the edge is unfolded. The other edge 20a of the metal foil 12 is folded in its entire length. In this modified case, the tap strips 27 and 28 are arranged at the same end surface of the capacitor element as the tap strips 25 and 26.

Figure 4:
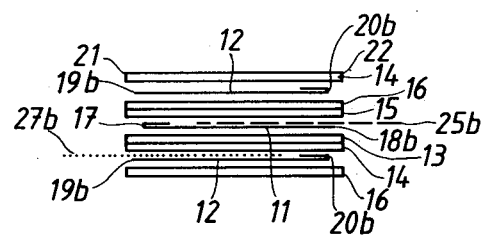

FIG. 4 shows schematically an additional, different embodiment of part of a capacitor element according to the present invention. According to this embodiment, the metal foil 11 has, in its entire length, a folded edge 17 at the end surface 23 of the element and an unfolded edge 18b at the end surface 24 of the element. In its entire length the metal foil 12 has an unfolded edge 19b at the end surface 23 of the element and a folded edge 20b at the end surface 24 of the element. The current tap strips 25b (and 26b) from the metal foil 11 protrude at the unfolded edge 18b at the end surface 24, and the current tap strips 27b (and 28b) from the metal foil 12 protrude at the unfolded edge 19b. The current tap strip 27b has been marked with a dotted line in order to mark that in reality it should be arranged in contact with the metal foil 12 in a layer of this metal foil which is located at a greater distance from the current tap strip 25b than is actually shown in FIG. 4.

Figure 5:
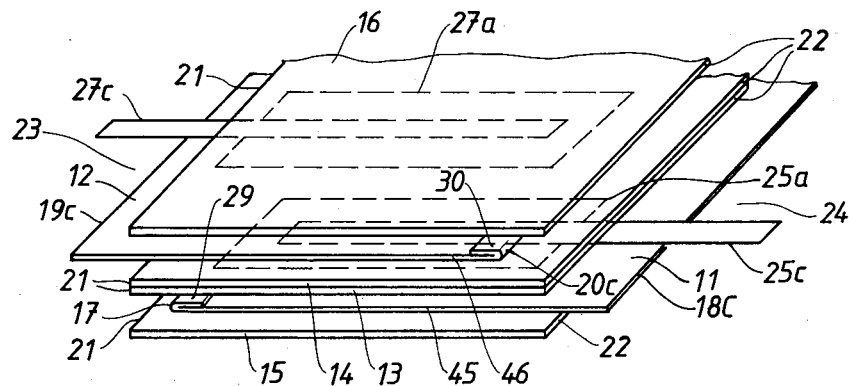

In the embodiment according to FIG. 5, the aluminium foil 11 is arranged with a folded edge 17 inside the edge 21 of the polymer films 13–16 and with an unfolded edge 18c arranged outside the edge 22 of the polymer films. The aluminium foil 12 is arranged with a folded edge 20c inside the edge 22 of the polymer films and with an unfolded edge 19c outside the edge 21 of the polymer films. The distance between an edge 21 (22) of a polymer film and a folded edge 17 (20c) of a metal foil 11 (12) is in the exemplified case 9 mm, and the distance between an edge 21 (22) of the polymer film and a protruding edge 19c (18c) of a metal foil 11 (12) is 4 mm. The tap strip 25c with the associated foil piece 25a is arranged between the foil 11 and the film 13, and the tap strip 27c with the associated foil piece 27a is arranged between the foil 12 and the film 16.

Figure 6:
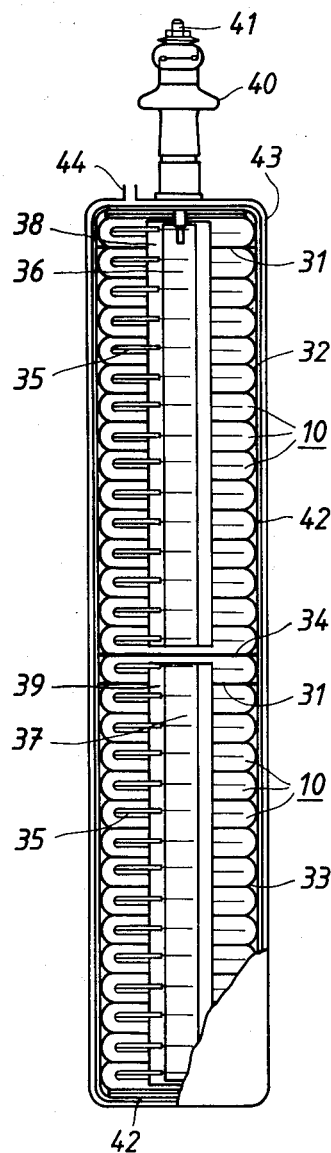
FIG. 6 shows a partly sectioned capacitor according to the invention in a section perpendicular to the winding axis of a capacitor element thereof.

In FIG. 6 there is shown a capacitor comprising a plurality of capacitor elements 10. Between adjacent capacitor elements 10 there are arranged spacers 31 of polypropylene film (only two such spacers being shown in FIG. 6). Half of the capacitor elements 10 are mutually parallel-connected to a group 32 and the remaining capacitor elements are parallel-connected to another group 33. These two groups 32 and 33 are series-connected to each other and are insulated from each other by a spacer 34 of polypropylene film which is thicker than the spacer 31. Within each group 32, 33, the current tap strips on one side of each element are connected via fuses 35 to a busbar 36, 37, respectively. Below each busbar 36, 37 there is arranged a strip 38, 39, respectively, of polypropylene film. The busbar 36 is connected to the top 41 of the bushing 40 and in a corresponding manner, the busbar 37 is connected to the top of another bushing (not shown) of the same kind. On the rear side of each capacitor element, the current tap strips are connected to a busbar (not shown) common to all groups. The package of elements is surrounded on all sides, thus also on the shown front side and on the not shown rear side, by an outer insulation 42 which insulates the package from the capacitor tank 43. The outer insulation comprises a mat of fibers of a polymer, such as e.g. polyethylene or polypropylene. Also if the use of materials of cellulose in capacitor elements and in spacers between them is avoided, it is possible to use cellulose, suitably in the form of pressboard, in the outer insulation since it is easily available for drying and therefore does not delay the drying to any mentionable extent. After the drying is finished, a dielectric fluid, for example an organic ester such as dioctyl phthalate or benzyl neocaprate, or a chlorinated hydrocarbon such as chlorinated diphenyl, to which a suitable stabilizer has been added, for example 1-epoxy-ethyl-3,4-epoxycyclohexane, is supplied through the opening 44 until the capacitor becomes completely filled up, whereafter the opening 44 is closed.

The invention has been described for the preferred case where the solid dielectric of the capacitor element completely consists of polymer film. However, the invention can also be applied to capacitor elements in which the solid dielectric partially consists of paper (of cellulose).

The invention can be modified in many ways within the scope of the appended claims.

What is claimed is:

1. A capacitor element for a power capacitor comprising: first and second metal foils wound together, solid dielectric material comprising polymer films separating the wound first and second metal foils from each other, one longitudinal metal foil edge adjacent each end of the capacitor element and being unfolded at least along a major part of its length inside the longitudinal edge of the polymer films and one longitudinal metal foil edge being folded at least substantially longitudinally throughout its length inside the longitudinal edges of the polymer films and exposed at said end of the capacitor element, at least one current tap strip in contact with the first metal foil and at least one further current tap strip in contact with the second metal foil, said current tap strips constituting separate elements and protruding endwise from the capacitor element, each said tap strip, adjacent the end of the capacitor element from which it protrudes, being positioned between folded edge portions of adjacent wound layers of the metal foil which the tap strip does not contact, said folded edge portions being folded substantially in the longitudinal direction of the metal foil in question.

2. A capacitor element according to claim 1, wherein, adjacent one end of the capacitor element, at least one of the current tap strips contacting the first metal foil protrudes endwise from the capacitor element and the longitudinal metal foil edge which is unfolded at least along a major part of its length is provided by the first metal foil, and the second metal foil is formed with said folded edge portions.

3. A capacitor element according to claim 2, wherein, adjacent the other end of the capacitor element remote from its said one end, the longitudinal edge of the second metal foil is unfolded.

4. A power capacitor comprising at least one capacitor element as claimed in claim 3.

5. A capacitor element according to claim 2, wherein, adjacent the other end of the capacitor element remote from its said one end, the longitudinal edge of the first metal foil is unfolded and the longitudinal edge of the second metal foil is folded.

6. A power capacitor comprising at least one capacitor element as claimed in claim 5.

7. A power capacitor comprising at least one capacitor element as claimed in claim 2.

8. A capacitor element according to claim 1, wherein at one end of the capacitor element the longitudinal edge of the first metal foil is folded and the longitudinal edge of the second metal foil is unfolded, and at the other end of the capacitor element the longitudinal edge of the first metal foil is unfolded and the longitudinal edge of the second metal foil is folded, the at least one current tap strip contacting the first metal foil protruding from the said other end of the capacitor element and the at least one current tap strip contacting the second metal foil protruding from the said one end of the capacitor element.

9. A capacitor element according to claim 8, wherein the unfolded longitudinal edges of the first and second metal foils are arranged outside the longitudinal edges of the polymer films adjacent the said other end and the said one end, respectively, of the capacitor element.

10. A power capacitor comprising at least one capacitor element as claimed in claim 8.

11. A capacitor element according to claim 1, wherein unfolded longitudinal edges of the metal foils are arranged further from a mid transverse center plane of the capacitor element than folded longitudinal edges or edge portions of the metal foils.

12. A capacitor element according to claim 1, wherein the opposite end edges of each metal foil in the wound capacitor element are transversely folded.

13. A capacitor element according to claim 1, wherein the solid dielectric material consists of polymer films.

14. A capacitor element according to claim 1, wherein the solid dielectric material further comprises cellulose material.

15. A power capacitor comprising at least one capacitor element as claimed in claim 1.

16. A power capacitor comprising at least one wound capacitor element which is built up of first and second metal foils and a solid dielectric comprising polymer films and in which, at each end surface of the capacitor element, (a) one of the metal foils is arranged with its edge inside the edge of the polymer films and there exposed to the capacitor element end surface between adjacent polymer films and with its edge folded along a line at least substantially extending in the longitudinal direction of the metal foil, and (b) one of the metal foils is arranged with its edge unfolded inside the edge of the polymer films at least along the main portion of its length, and in which each metal foil is arranged in contact with separate current tap strips which from the interior of the capacitor element protrude outside an end surface of the capacitor element, wherein each metal foil is arranged in contact with at least one current tap strip which, at the end surface of the capacitor element where this current tap strip protrudes, is surrounded, at least nearest the current tap strip, by layers of the other metal foil, in which the other metal foil is arranged with its edge folded along a line at least essentially extending in the longitudinal direction of the metal foil.

* * * * *